US007130150B2

(12) United States Patent
Ng et al.

(10) Patent No.: US 7,130,150 B2
(45) Date of Patent: Oct. 31, 2006

(54) INTEGRATED FILTER SYSTEM FOR A DATA STORAGE DEVICE

(75) Inventors: Quock Ying Ng, Singapore (SG); Yiren Hong, Singapore (SG); JingShi Goh, Singapore (SG); Niroot Jierapipantanakul, Singapore (SG); Djohni Chandra, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 158 days.

(21) Appl. No.: 10/629,373

(22) Filed: Jul. 29, 2003

(65) Prior Publication Data

US 2005/0024763 A1  Feb. 3, 2005

(51) Int. Cl.
*G11B 33/14* (2006.01)
(52) U.S. Cl. .................................. 360/97.02
(58) Field of Classification Search ............. 360/97.02
See application file for complete search history.

(56) References Cited

U.S. PATENT DOCUMENTS

| 4,329,722 | A | | 5/1982 | West |
| 5,307,222 | A | | 4/1994 | Dion |
| 5,406,431 | A | | 4/1995 | Beecroft |
| 5,754,365 | A | * | 5/1998 | Beck et al. ............... 360/97.02 |
| 6,208,484 | B1 | * | 3/2001 | Voights ................... 360/97.02 |
| 6,238,467 | B1 | | 5/2001 | Azarian |
| 6,266,208 | B1 | | 7/2001 | Voights |
| 6,296,691 | B1 | | 10/2001 | Gidumal |
| 6,395,073 | B1 | | 5/2002 | Dauber |
| 6,709,498 | B1 | * | 3/2004 | Tuma ........................... 96/134 |

* cited by examiner

*Primary Examiner*—A. J. Heinz
(74) *Attorney, Agent, or Firm*—Fellers, Snider, et al.

(57) ABSTRACT

An apparatus for mitigating particle and aerosol contaminants from an internal environment of a data storage device is disclosed. The apparatus includes a base, a breather diffusion path formed in the base, a re-circulating filter channel adjacent the base, and an absorption filter chamber adjacent the re-circulating filter channel and communicating with the breather diffusion path.

A breather filter removes particulates from air migrating through the diffusion path. The length and diameter of the diffusion path precludes transfer of humidity from the external environment of the data storage device to the internal environment of the data storage device. A re-circulating filter spans the re-circulating filter channel and removes particulates from airstreams passing through the re-circulating filter channel, and a substantially carbon based absorption filter extracts corrosive gases and organic vapors from the internal environment of the data storage device.

20 Claims, 4 Drawing Sheets

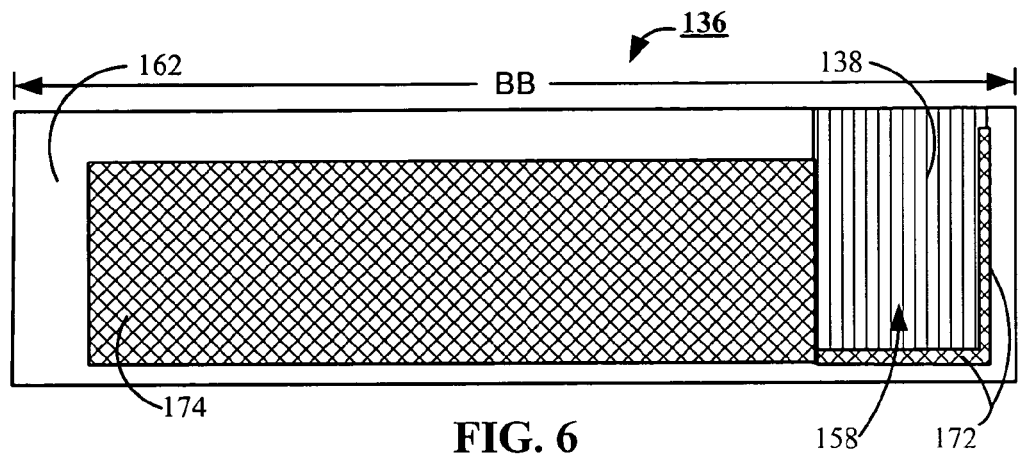
FIG. 6
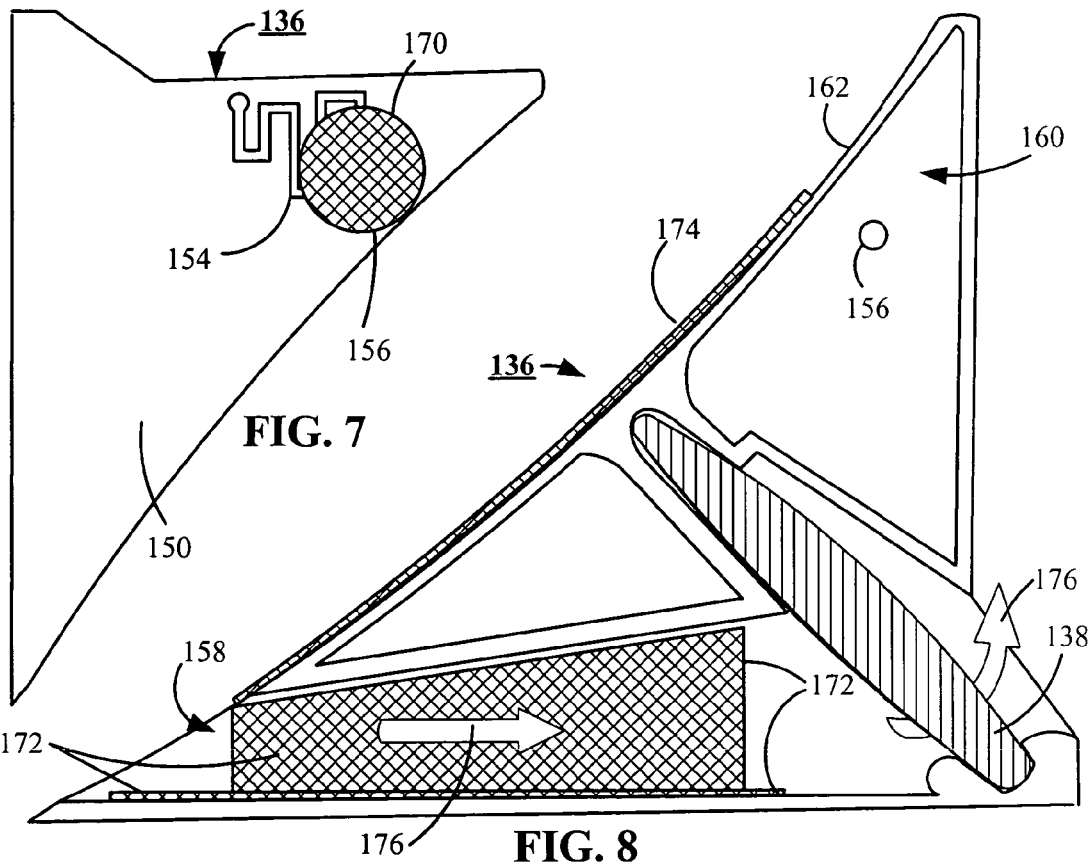
FIG. 7
FIG. 8
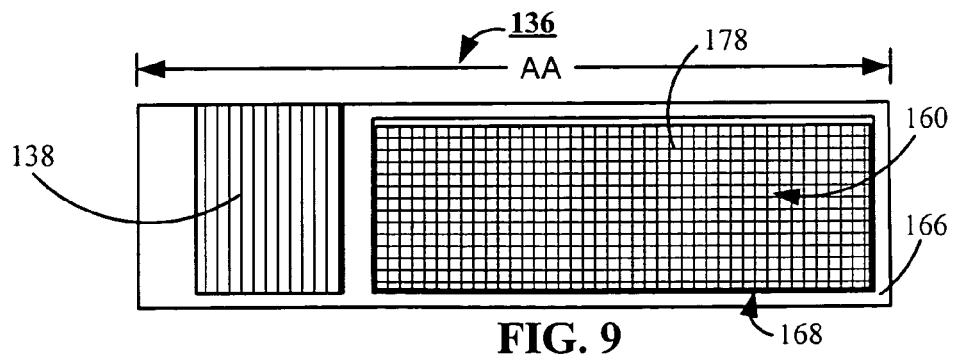
FIG. 9

INTEGRATED FILTER SYSTEM FOR A DATA STORAGE DEVICE

FIELD OF THE INVENTION

The claimed invention relates to the field of data storage devices. More particularly, but not by way of limitation, this invention relates to an all-in-one integrated filter system for minimization and control of internal contaminants of a data storage device.

BACKGROUND

One key component of a computer system is a data storage device, such as a disc drive. The most basic parts of a disc drive (drive) are a data storage disc (disc) that is rotated beneath a read/write head (head). Rotation of the disc beneath the head generates an air bearing upon which the head flies. An actuator moves the flying head to various locations over substantially concentric data tracks of the disc to facilitate data exchanges between the head and the disc, and electrical circuitry encodes the data being exchanged and controls drive operations including control of the exchange of data between the computer system and the disc.

Airborne contaminants including particulates, corrosive gases and organic vapors pose reliability issues for the drive. Particulates can disrupt the air bearing causing the head to lose flight and impact the disc. Physical contact between the head and disc during drive operations expose the head and disc to damage, either a catastrophic failure (i.e., a head crash) or surface wear, which degrades drive reliability. Corrosive gases and organic vapors that interact with surface materials of the disc and head causing stiction between the head and disc, or promoting growth of asperities on the disc, further impair drive reliability.

Sources of corrosive gases and organic vapors may be found in the environment external to the drive, for example in a situation where the drive supports a control processor controlling chemical processing operations, or they may originate from materials used in the construction of the drive, such as gaskets, seals or adhesives. An out-gassing over time of volatiles from seals, gaskets or adhesives is typically a relatively slow process; however the aggregate accumulation of the out-gassing material may cause stiction between the head and disc, or promoting growth of asperities on the disc.

As such, challenges remain and a need persists for improvements in filter systems to cost effectively mitigate contaminants impacting operations of data storage devices.

SUMMARY OF THE INVENTION

In accordance with preferred embodiments, an apparatus and combination are provided for mitigating contaminants from an interior environment of a data storage device. The combination includes a base deck with a disc stack assembly attached to the base deck and an actuator assembly adjacent the disc stack assembly secured to the base deck. The disc stack assembly includes a motor assembly that supports and rotates a data storage disc. A read/write head is supported by the actuator assembly, which rotates a read/write head adjacent the disc in a data exchange relationship with the disc.

Also included in the combination is a top cover attached to the base deck, which encloses the disc stack assembly and the actuator assembly within a confined environment, and a filtering apparatus for filtering contaminants from the confined environment.

The filtering apparatus filters contaminants from the confined environment of the data storage device and includes a base, a breather diffusion path formed in the base, a re-circulating filter channel adjacent the base and an absorption filter chamber adjacent the re-circulating filter channel. The absorption filter communicates with the breather diffusion path via a diffusion aperture. A re-circulating filter is confined within the re-circulating filter channel by a pair of re-circulating filter grooves, the absorption filter chamber houses a carbon based absorption filter and a breather filter communicates with the breather diffusion path to filter particulate contaminants from an environment external to the data storage device.

The carbon based absorption filter absorbs corrosive gases and organic vapors from the confined environment of the data storage device. The filtering apparatus also includes a surface filter medium partially lining the re-circulating filter channel, and a shroud filter wall adjacent the absorption filter chamber, which supports an impact filter medium. The surface filter medium assists in removal of particle and aerosol contaminants from the confined environment of the data storage device and the impact filter medium removes particles from air flow, (generated by rotation of the disc) that avoids passage through the re-circulating filter channel.

These and various other features and advantages that characterize the claimed invention will be apparent upon reading the following detailed description and reviewing the associated drawings.

BRIEF DESCRIPTION OF THE DRAWINGS

FIG. 6 is a first side elevational view of the filtering apparatus of FIG. 1, with a surface filter medium supported by a shroud wall.

FIG. 7 is a bottom plan view of the filtering apparatus of FIG. 1, with an attached breather filter.

FIG. 8 is a cross sectional top plan view of the filtering apparatus of FIG. 1, with surface filter medium attached thereon.

FIG. 9 is a second side elevational view of the filtering apparatus of FIG. 1, with an absorption filter positioned within an absorption chamber of the filter apparatus.

DETAILED DESCRIPTION

Figure 1:
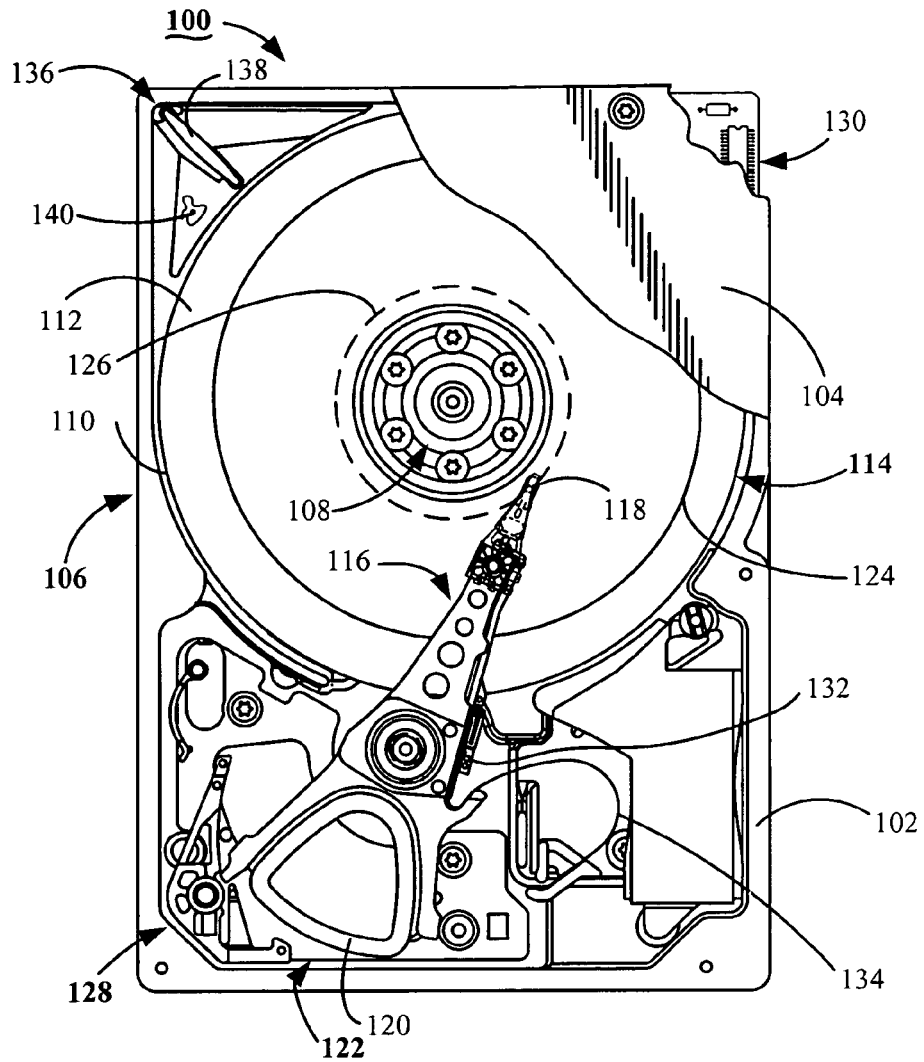
FIG. 1 is a partial cutaway top plan view of a data storage device (DSD) that incorporates a filtering apparatus for filtering contaminants from an internal confined environment of the DSD.

Referring now to the drawings, FIG. 1 provides a top plan view of a data storage device (DSD) 100. The DSD 100 includes a base deck 102 cooperating with a top cover 104 (shown in partial cutaway) to form a sealed housing (also referred to as a confined environment) for a mechanical portion of the DSD 100, referred to herein as a head-disc assembly 106.

A spindle motor assembly 108 (also referred to as motor 108) rotates a number of data storage discs (discs) 110 at a substantially constant operational speed. Each disc 110 includes at least one magnetic recording surface 112. The spindle motor assembly 108 with the disc 110 attached thereon form a disc stack assembly 114. An actuator assembly 116 supports a number of read/write heads (heads) 118. The heads 118 are used for data exchange operations with the magnetic recording surface 112. Upon applying a current to a coil 120 of a voice coil motor (VCM) 122, the actuator assembly 116, which is attached to the coil 120, responds by rotating the heads 118 to a position adjacent the magnetic recording surfaces 112.

During operation of the DSD 100, the actuator 116 rotates the heads 118 into a data exchange relationship with data tracks 124 on the magnetic recording surface 112 to write data to and read data from the discs 110. When the DSD 100 is deactivated, the actuator 116 positions the heads 118 adjacent a home position 126 and the actuator 116 is confined by latching to toggle latch 128.

Command, control and interface electronics for the DSD 100 are provided on a printed circuit board assembly 130 mounted to the head-disc assembly 106. During data transfer operations, a preamplifier/driver (preamp) 132 attached to a flex circuit 134 conditions read/write signals conducted by the flex circuit 134 between the printed circuit board assembly 130 and the heads 118.

During operation of the DSD 100, a filter apparatus 136 located in the base deck 102 and adjacent the disc stack 114, mitigates particulate and aerosol contaminants from within the confined environment of the head-disc assembly 106. Included in the filter apparatus 136, is a re-circulating filter 138. A breather aperture 140, shown through a partial cut-away of the filter apparatus 136, is provided in the base deck 102 to exchange air between the environment external to the head-disc assembly 106 to the confined environment within the head-disc assembly 106.

Figure 2:
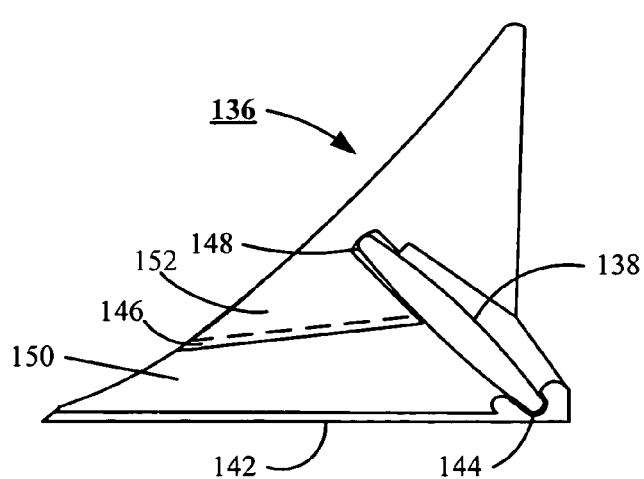
FIG. 2 is a top plan view of the filtering apparatus of FIG. 1.

FIG. 2 shows a first re-circulating filter channel wall 142 with a first re-circulating filter retention groove 144, and a second re-circulating filter channel wall 146 with a second re-circulating filter retention groove 148. In a preferred embodiment, the structure of the filter apparatus 136, as illustrated by FIG. 2, is formed from a molded polymer. However, non-magnetic ridged metals or ceramics may be elected to form the filter apparatus 136. The material elected may be cast or machined, or cast and machined.

The first and second re-circulating filter retention grooves, 144 and 148, retain the re-circulating filter 138 during operations of the DSD 100, while a base 150 supports the re-circulating filter 138 from below. In other words the base 150 communicates with the first re-circulating filter channel wall 142 (which includes the first re-circulating filter retention groove 144) and the second re-circulating filter channel wall 146 (which includes the second re-circulating filter retention groove 148) to form the confines for retaining the re-circulating filter 138 within the filter apparatus 136.

Additionally, FIG. 2 shows a cover 152 supported by the second re-circulating filter channel wall 146 (the internal surface of the second re-circulating filter channel wall 146 is illustrated by a hidden line).

Figure 3:
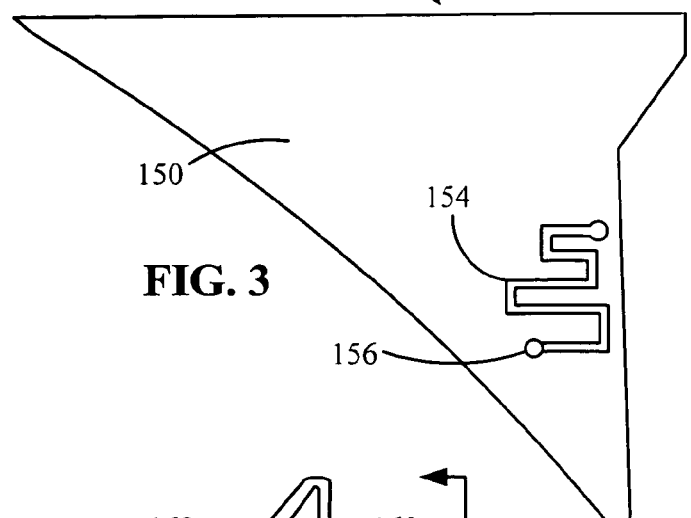
FIG. 3 is a bottom plan view of the filtering apparatus of FIG. 1.

FIG. 3 shows a breather diffusion path 154 formed in the base 150. In a preferred embodiment of the DSD 100, the breather diffusion path 154 communicates with a diffusion aperture 156 at a proximal end of the breather diffusion path 154 and the breather aperture 140 (of FIG. 1) at a distal end of the breather diffusion path 154. Collectively, the breather aperture 140, the breather diffusion path 154 and the diffusion aperture 156 permit passage between the environment external to the head-disc assembly 106 (of FIG. 1) and the environment confined within the head-disc assembly 106.

The breather aperture 140 and the diffusion aperture 156 facilitate equalization of interior and exterior atmospheric pressures of the head-disc assembly 106 (of FIG. 1). Equalization of interior and exterior atmospheric pressures minimizes a risk of damage to seals and gaskets of the head-disc assembly 106, in particular, seals used by the motor 108 (of FIG. 1).

The breather diffusion path 154 has a predetermined cross-sectional area and a predetermined overall length that permits passage between the internal and external environments of the head-disc assembly 106 while precluding passage of humidity between the two environments.

As will be discussed in greater detail below, a breather filter (not shown) is interposed across the passage between the environment external to the head-disc assembly 106 and the environment confined within the head-disc assembly 106. The breather filter may be positioned in any convenient location along the passage to primarily prevent ingress of particulate contaminants from the external environment.

Figure 4:
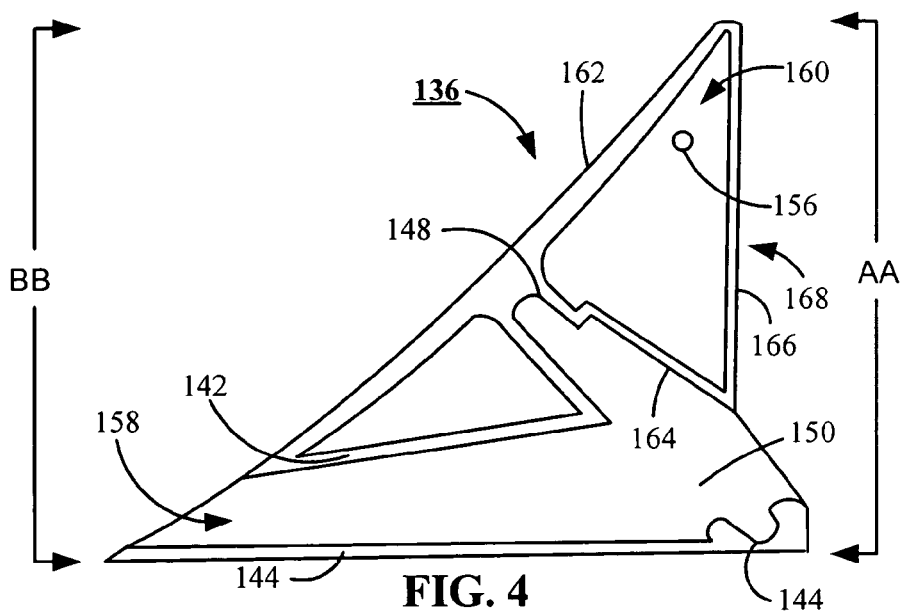
FIG. 4 is a cross sectional top plan view of the filtering apparatus of FIG. 1.

FIG. 4 shows a re-circulating filter channel 158 adjacent the base 150, and an absorption filter chamber 160 adjacent the base 150 and adjacent the second re-circulating filter retention groove 148. The base 150 communicates with the first re-circulating filter channel wall 142 and the second re-circulating filter channel wall 146 to form boundaries of the re-circulating filter channel 158.

Also shown by FIG. 4 is a shroud filter wall 162, a first absorption filter confinement wall 164 and a second absorption filter confinement wall 166. The shroud filter wall 162 in conjunction with the first and second absorption filter confinement walls, 164 and 166, provide additional support for the cover 152 (of FIG. 2).

FIG. 4 further shows an absorption filter aperture 168 provided by the second absorption filter confinement wall 166. The absorption filter aperture 168 promotes access for placement of an absorption filter (not shown) within the absorption filter chamber 160.

Figure 5:
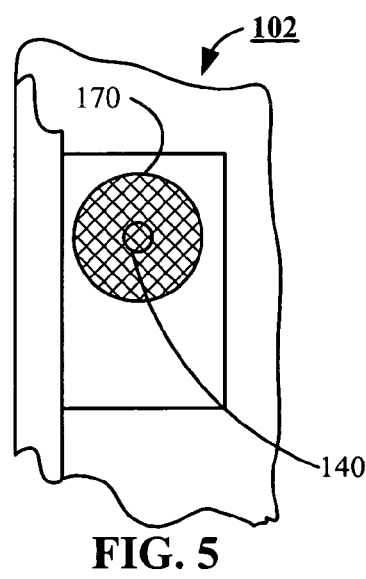
FIG. 5 is a partial cutaway top plan view of a base deck of the DSD of FIG. 1, with an attached breather filter.

FIG. 5 shows a breather filter 170 adjacent the breather aperture 140 and supported by the base deck 102. The breather filter 170 filters particle and aerosol contaminants from an air stream migrating through the breather diffusion path 154 (of FIG. 3).

FIG. 6 shows a surface filter medium 172 partially lining the inner walls of the re-circulating filter channel 158, and an impact filter medium 174 supported by an external surface of the shroud filter wall 162. It has been found that a hepa type filter with electrostatic media is a useful medium for both the impact filter medium 174 and the surface filter medium 172. As the disc 110 (of FIG. 1) rotates, air flows from the inner diameter to the outer diameter of the disc 110. A portion of the air flow generated by rotation of the disc 110 enters the re-circulating filter channel 158 and continues until the air flow impacts the re-circulating filter 138. Particles supported by the air flow are removed from the air flow by the re-circulating filter 138.

However, upon impacting the re-circulating filter 138, air flowing through the re-circulating filter channel 158 is retarded. Flow retardation produces vortices and back-flow. By partially lining the re-circulating filter channel 158 with the surface filter medium 172, contaminants caught up in the turbulence created by the re-circulating filter 138 will interact with the surface filter medium 172 and be removed from the air flow.

Similarly, air flow developed by rotation of the disc 110 that fails to enter the re-circulating filter channel 158 impacts the shroud filter wall 162, and particles carried along by the air flow are collected by the impact filter medium 174.

In an alternate embodiment shown by FIG. 7, the breather filter 170 is adjacent the diffusion aperture 156 and supported by the base 150 of the filter apparatus 136. During operation of the DSD 100 (of FIG. 1), the breather filter 170 filters particle and aerosol contaminants from air exchange between the confined environment within the head-disc assembly 106 (of FIG. 1) and the environment external to the head-disc assembly 106.

FIG. 8 shows the top view of the relationship between the impact filter medium 174 and the surface filter medium 172, as well as the direction of air flow of an air stream 176 as the air stream 176 progresses through the re-circulating filter 138 of the filter apparatus 136.

FIG. 9 shows an absorption filter 178 positioned within the absorption filter chamber 160. Corrosive gases and organic vapors carried along in the air stream 176 (of FIG. 8) that fail to be collected by the re-circulating filter 138 are collected by the absorption filter 178. Although other materials may be used, granular carbon structures with a large surface area, as well as carbonate coated carbon structures have been found useful in forming the absorption filter 178.

Figure 10:
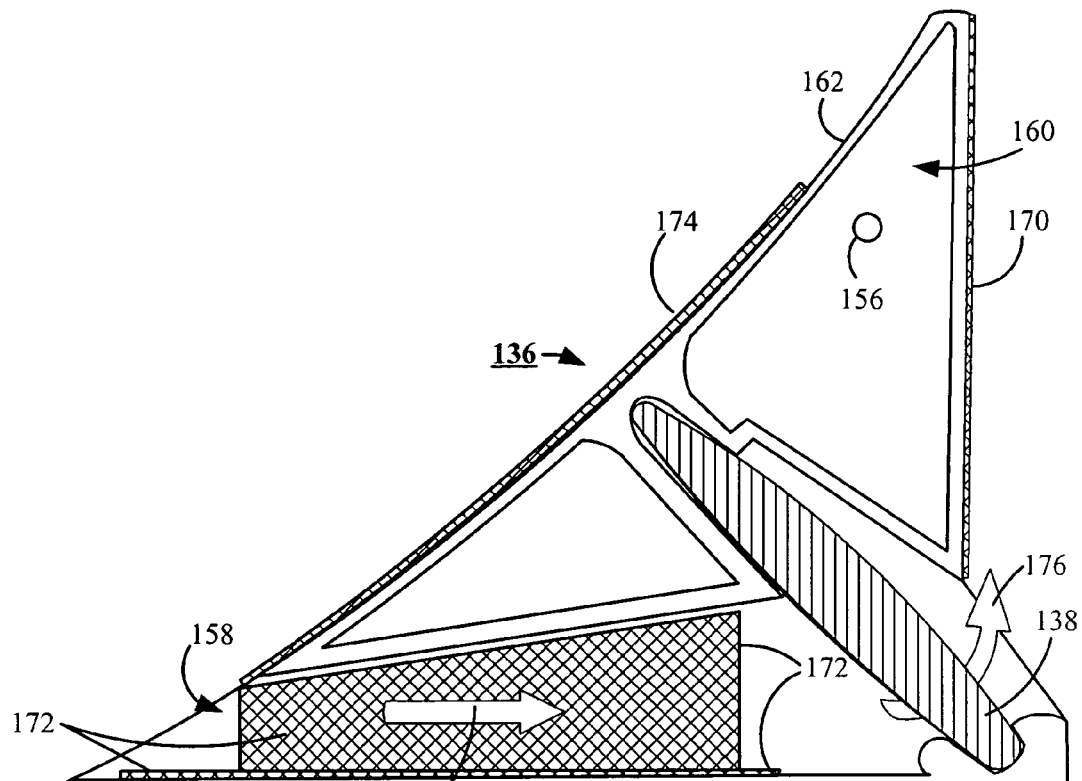
FIG. 10 is a cross sectional top plan view of an alternate preferred embodiment of the filter apparatus of FIG. 9, with an alternate attachment location for the breather filter of FIG. 8.

FIG. 10 shows an alternate preferred embodiment of the filter apparatus 136 presenting the top view of the relationship between the impact filter medium 174 and the surface filter medium 172, as well as the direction of air flow of an air stream 176 as the air stream 176 progresses through the re-circulating filter 138 of the filter apparatus 136 along with an alternate configuration and mounting location for the breather filter 170.

Figure 11:
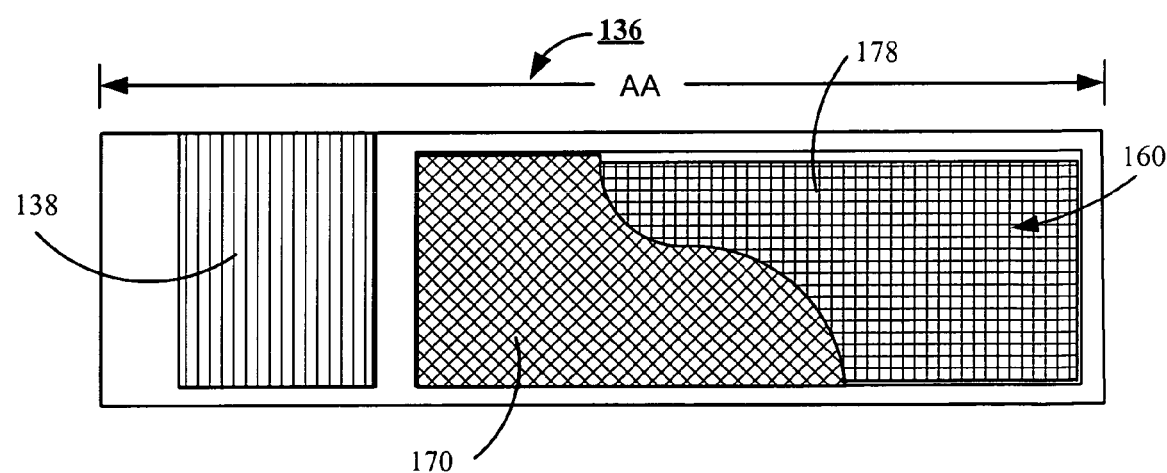
FIG. 11 is a second side partial cutaway elevational view of an alternate preferred embodiment of the filter apparatus of FIG. 10, with an alternate attachment location for the breather filter of FIG. 8.

FIG. 11 shows an absorption filter 178 positioned within the absorption filter chamber 160. Corrosive gases and organic vapors carried along in the air stream 176 (of FIG. 8) that fail to be collected by the re-circulating filter 138 are collected by the absorption filter 178. FIG. 11 additionally shows a partial cutaway view of the breather filter 170 mounted adjacent the absorption filter 178.

An airflow passing through the diffusion aperture 156 (of FIG. 10) from the external environment to the internal environment of the head-disc assembly 106 (of FIG. 1) first encounters the absorption filter 178, which absorbs corrosive gases and organic vapors present in the airflow. Particulates present in the airflow, not bound up in the absorption filter 178, are extracted from the airflow by the breather filter 170.

It is noted that, although the breather filter 170 is not in direct communication with the diffusion aperture 156, the breather filter 170 remains a breather filter. As shown by FIG. 11, the breather filter 170 is conveniently interposed across the airflow between the environment external to the head-disc assembly 106 and the environment confined within the head-disc assembly 106 (i.e., the airflow passing through the diffusion aperture 156 (of FIG. 10) from the external environment to the internal environment of the head-disc assembly 106 and subsequently through the absorption filter 178,) to primarily prevent ingress of particulate contaminants from the external environment from contaminating the internal environment of the head-disc assembly 106.

Accordingly, embodiments of the present invention are generally directed to a filter apparatus (such as 136) and a combination that includes a base deck (such as 102) supporting a disc stack assembly (such as 114) with a disc (such as 110) attached thereon, and an actuator assembly (such as 116) supporting a read/write head (such as 118). Additionally, the combination includes a top cover (such as 104) attached to the base deck that encloses the disc stack assembly and the actuator assembly within a confined environment of the combination along with the filter apparatus.

The filtering apparatus filters contaminants from the confined environment of the combination. The filtering apparatus includes a base (such as 150) with a breather diffusion path (such as 154) formed in the base, a re-circulating filter channel (such as 158) adjacent the base, and an absorption filter chamber (such as 160) communicating with the breather diffusion path and located adjacent the re-circulating filter channel.

A re-circulating filter (such as 138) is confined within the re-circulating filter channel by a pair of re-circulating filter retention grooves (such as 144 and 148). The absorption filter chamber houses a carbon based absorption filter (such as 178), and a breather filter (such as 170) communicates with the breather diffusion path to filter particulate contaminants from entry into the confined environment of the combination. The carbon based absorption filter absorbs corrosive gases and organic vapors from the confined environment of the combination.

The filtering apparatus also preferably includes a surface filter medium (such as 172) partially lining the re-circulating filter channel, and a shroud filter wall (such as 162) adjacent the absorption filter chamber supporting an impact filter medium (such as 174). The surface filter medium assists in removal of particle and aerosol contaminants from the confined environment of the combination and the impact filter medium removes particles from air flow that avoids passage through the re-circulating filter channel.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A filter apparatus comprising a channel capable of guiding a portion of an internal fluid stream within an enclosure through a recirculating filter and a filter chamber disposed in the internal fluid stream portion immediately downstream of the recirculating filter, the filter chamber capable of filtering an external fluid stream through a diffusion path.

2. The filter apparatus of claim 1, further comprising a filter disposed outside the channel capable of filtering the internal fluid stream portion not entering the channel.

3. The filter apparatus of claim 2 wherein the filter disposed outside the channel is supported by the filter chamber.

4. The filter apparatus of claim 3 wherein the filter disposed outside the channel defines a shroud in close mating relationship with a moving member that creates the internal fluid stream.

5. The filter apparatus of claim 1 wherein the channel supports a carpet filter.

6. The filter apparatus of claim 1 wherein the channel is sized to fluidly communicate with a first area of an upstream side of the recirculating filter, and the filter apparatus is sized to fluidly communicate with a second area of a downstream side of the recirculating filter, wherein the second area is substantially greater than the first area to impart a relatively reduced pressure region in the fluid stream portion downstream of the recirculating filter.

7. The filter apparatus of claim 6 wherein the diffusion path comprises a breather aperture on an external side of the enclosure and a diffusion aperture on an internal side of the enclosure, wherein the diffusion aperture is disposed in the relatively reduced pressure region.

8. The filter apparatus of claim 7 comprising a filter capable of intercepting fluid flowing through the diffusion path.

9. The filter apparatus of claim 7 wherein the filter chamber defines a permeable enclosure around the diffusion aperture.

10. The filter apparatus of claim 9 wherein the enclosure supports a filter capable of intercepting the fluid flowing though the diffusion path.

11. The filter apparatus of claim 9 wherein the enclosure contains a filter capable of intercepting the fluid flowing through the diffusion path.

12. The filter apparatus of claim 7 wherein the filter chamber adsorbs contaminants flowing into the enclosure via the diffusion path.

13. A data storage device with a moving data storage medium creating the internal fluid stream that is conditioned by the filter apparatus of claim 12.

14. A data storage device comprising:
a base deck;
a disc stack assembly secured to the base deck;
an actuator assembly adjacent the disc stack assembly and affixed to the base deck;
a top cover attached to the base deck enclosing the disc stack assembly and the actuator assembly within a confined environment; and
means for filtering contaminants from the confined environment.

15. A method comprising:
rotating a data storage medium inside an enclosure to create an internal fluid stream;
diverting a portion of the internal fluid stream through a recirculating filter; and
fluidly mixing the internal fluid stream portion and an external fluid stream with a filter chamber disposed within the internal fluid stream immediately downstream of the recirculating filter.

16. The method of claim 15 wherein the diverting step is characterized by providing a channel comprising a proximal end in fluid communication with the internal fluid stream and a distal end in fluid communication with a first area of an upstream side of the recirculating filter.

17. The method of claim 16 wherein the mixing step is characterized by enclosing the recirculating filter with a second area on a downstream side of the recirculating filter in order to induce a pressure drop in the internal fluid steam across the recirculating filter.

18. The method of claim 17 wherein the mixing step is characterized by filtering the external fluid stream.

19. The method of claim 18 wherein the diverting and mixing steps are characterized by adsorbing contaminants from the fluid streams.

20. The method of claim 15 comprising filtering a non-diverted portion of the internal fluid steam.

* * * * *